United States Patent
Suguro et al.

(10) Patent No.: US 8,242,213 B2
(45) Date of Patent: Aug. 14, 2012

(54) METHOD FOR MANUFACTURING POLYRADICAL COMPOUND AND BATTERY

(75) Inventors: Masahiro Suguro, Tokyo (JP); Shigeyuki Iwasa, Tokyo (JP); Jirou Iriyama, Tokyo (JP); Kentaro Nakahara, Tokyo (JP); Masaharu Satou, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/052,687

(22) Filed: Mar. 21, 2011

(65) Prior Publication Data

US 2011/0172378 A1 Jul. 14, 2011

Related U.S. Application Data

(62) Division of application No. 11/791,652, filed as application No. PCT/JP2005/019025 on Oct. 17, 2005, now abandoned.

(30) Foreign Application Priority Data

Dec. 6, 2004 (JP) ................................. 2004-353061

(51) Int. Cl.
*C08F 293/00* (2006.01)

(52) U.S. Cl. ........ 525/273; 525/314; 526/204; 526/217; 526/220; 526/328; 526/328.5; 526/329.2; 526/329.3; 526/346

(58) Field of Classification Search .................. 525/314; 526/204, 217, 220, 328, 328.5, 329.2, 329.3, 526/346
See application file for complete search history.

(56) References Cited

U.S. PATENT DOCUMENTS 4,442,187 A 4/1984 MacDiarmid et al.
(Continued)

FOREIGN PATENT DOCUMENTS

JP 05-074459 3/1993
(Continued)

OTHER PUBLICATIONS

Reppe et al., Vinylierung:, Liebigs Ann. Chem. Bd. 601, pp. 81-111 (1956).
(Continued)

*Primary Examiner* — Helen O Conley
(74) *Attorney, Agent, or Firm* — Young & Thompson

(57) ABSTRACT

In the present invention, in order to provide an electrode active material that has a high capacity density and from which a large current can be extracted and to provide a battery that has a high energy density and produces a large output, in a battery comprising at least a cathode, an anode and an electrolyte, a polyradical compound having a partial structure represented by the following general formula (2) is used as an electrode active material for at least one of the cathode and the anode, (2)

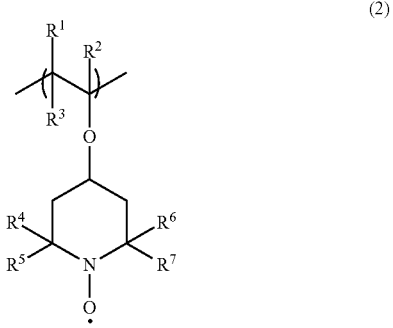

wherein, in the formula (2), $R^1$ to $R^3$ independently represent a hydrogen atom or a methyl group; and $R^4$ to $R^7$ independently represent an alkyl group having 1 to 3 carbon atoms.

4 Claims, 1 Drawing Sheet

1. aluminum exterior housing
2. insulating gasket
3. anode collector
4. anode
5. separator
6. cathode
7. cathode collector
1. aluminum exterior housing

U.S. PATENT DOCUMENTS

| | | |
|---|---|---|
| 4,833,048 A | 5/1989 | Dejonghre et al. |
| 2004/0115529 A1 | 6/2004 | Nakahara et al. |

FOREIGN PATENT DOCUMENTS

| | | |
|---|---|---|
| JP | 2001-283920 | 10/2001 |
| JP | 2002-117853 | 4/2002 |
| JP | 2002-117855 | 4/2002 |
| JP | 2002-151084 | 5/2002 |
| JP | 2002-298850 | 10/2002 |
| JP | 2002-304996 | 10/2002 |
| JP | 2002-313344 | 10/2002 |
| JP | 2003-022809 | 1/2003 |
| JP | 2003-073321 | 3/2003 |
| JP | 2003-132891 | 5/2003 |

OTHER PUBLICATIONS

Watanabe et al., "Homogeneous Metal Salt Catalysis in Organic Reactions. I. The Preparation of Vinyl Ethers by Vinyl Transetherification", vol. 79, pp. 2828-2833 (1957).

Okimoto et al., Development of a Highly Efficient Catalytic Method for Synthesis of Vinyl Ethers:, J. Am. Chem. Soc., vol. 124, No. 8, pp. 1-2 (2002).

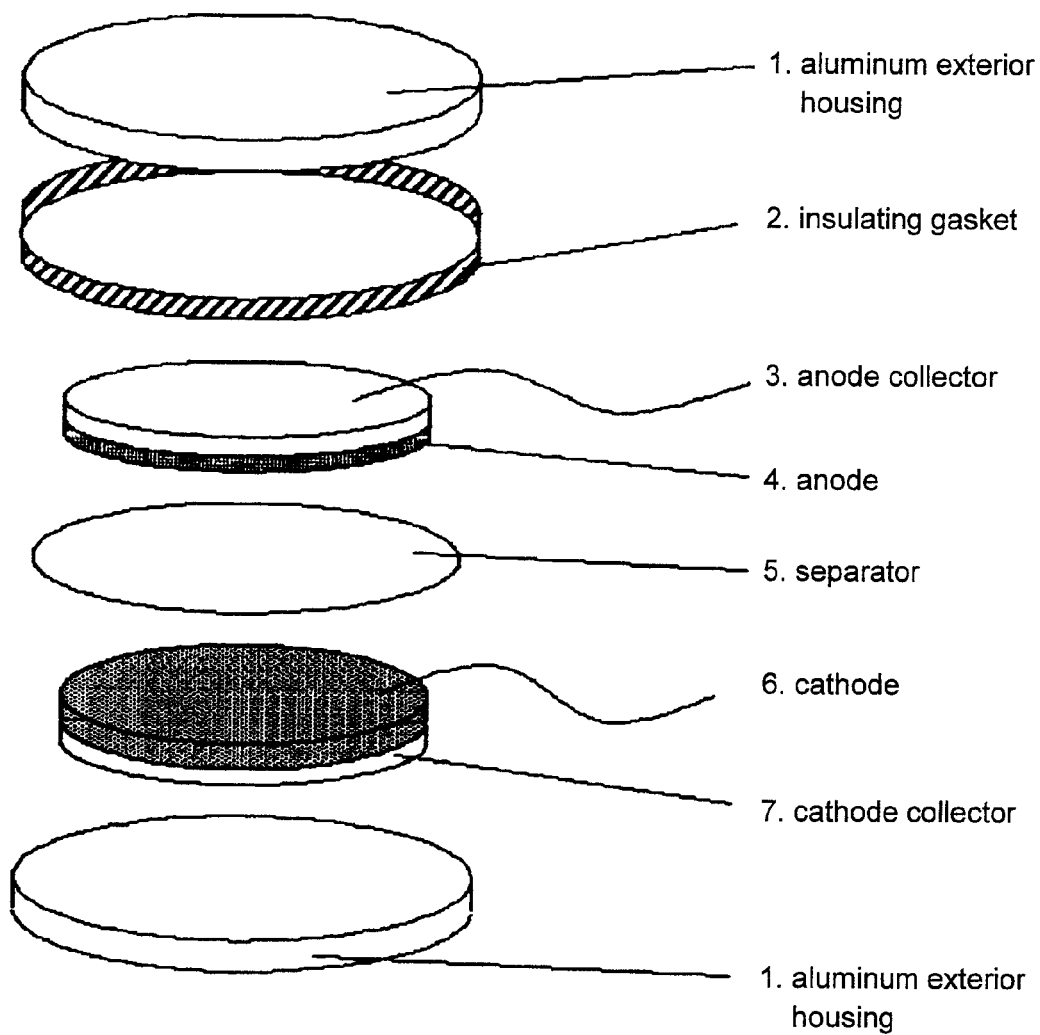

METHOD FOR MANUFACTURING POLYRADICAL COMPOUND AND BATTERY

TECHNICAL FIELD

The present invention relates to an electrode active material that has a high capacity density and from which a large current can be extracted; a battery that has a high energy density and produces a large output; and a polyradical compound that can be the electrode active material having the above-mentioned properties.

BACKGROUND ART

In recent years, portable electronic devices such as laptop computers or cellular phones have become widespread rapidly with developments of communication systems, and also have increased in performance year after year. In particular, portable devices tend to increase their power consumptions with increase in performance. Therefore, as to a battery which works as a power supply thereof, there has been increasing demand of high energy density, a large output, and the like.

As a battery having a high energy density, a lithium ion battery has been developed and widely used since the 1990s. In the lithium ion battery, as an electrode active material, for example, a lithium-containing transition metal oxide such as lithium manganate or lithium cobaltate is used for a cathode, and carbon is used for an anode. The lithium ion battery uses an insertion reaction of lithium ions into the electrode active material and an elimination reaction of lithium ions from the electrode active material to charge and discharge. Such a lithium ion battery has a high energy density and exhibits excellent cycle performance, and thus the lithium ion battery is used in various kinds of electronic devices represented by cellular phones. However, the lithium ion battery has a low reaction rate of the electrode reaction, and thus extracting a large current seriously deteriorates battery properties. Therefore, the lithium ion battery has drawbacks of having difficulties to produce a large output and also requiring many hours to recharge.

As a storage device that produces a large output, an electric double layer capacitor is known. The electric double layer capacitor can discharge a large current at one time and thereby producing a large output. The electric double layer capacitor also exhibits excellent cycle performance, and has been developed as a backup power supply. However, the electric double layer capacitor is not suitable for a power supply of portable electronic devices because the capacitor has a very low energy density and downsizing of the capacitor is difficult.

For the purpose of obtaining an electrode material that is lightweight and has a high energy density, there has been developed a battery using a sulfur compound or an organic compound as an electrode active material. For example, Patent Document 1 (U.S. Pat. No. 4,833,048) and Patent Document 2 (Japanese Patent No. 2,715,778) disclose a battery using an organic compound having a disulfide bond for a cathode. This battery uses an electrochemical oxidation-reduction reaction that involves forming and dissociating disulfide bonds as the principle on which the battery operates. The battery is composed of an electrode material containing sulfur or carbon as its main component, both of which are elements of low specific gravity, thereby achieving some effects as a large capacity battery having a high energy density. However, the battery has a drawback that its capacity tends to decrease through charging and discharging cycles because the dissociated bonds have a low efficiency to form the bonds again and the electrode active material diffuses into an electrolyte solution.

In addition, as a battery using an organic compound, there is proposed a battery using a conductive polymer as an electrode material. This battery uses doping and undoping reactions of electrolyte ions for the conductive polymer as the principle on which the battery operates. The doping reaction is defined as a reaction of stabilizing charged radicals generated by oxidation or reduction of the conductive polymer by counter ions. Patent Document 3 (U.S. Pat. No. 4,442,187) discloses a battery using such a conductive polymer as a cathode or anode material. This battery consists of only sulfur and carbon both of which are elements of low specific gravity, and was expected as a large capacity battery. The conductive polymer, however, has a property that charged radicals generated by oxidation or reduction of the conductive polymer are delocalized over a wide region of $\pi$-electron conjugated system and the charged radicals interact each other to cause electrostatic repulsion or elimination of the radicals. This property restricts the generation of charged radicals, namely the concentration of doping, and thus limits the capacity of a battery. For example, it is reported that a battery using polyaniline as a cathode has a doping ratio of 50% or less, and a battery using polyacetylene as a cathode has a doping ratio of 7%. The battery using a conductive polymer as an electrode material achieves some effects in weight reduction, however, a battery having a high energy density has not been obtained.

As a battery using an organic compound as an electrode active material, there is proposed a battery using an oxidation reduction reaction of a radical compound. For example, Patent Document 4 (Japanese Patent Application Laid-Open No. 2002-151084) discloses an organic radical compound such as a nitroxide radical compound, an aryloxy radical compound, and a polymer having a specific amino triazine structure as an active material; and a battery using the organic radical compound as a positive or anode material. Furthermore, Patent Document 5 (Japanese Patent Application Laid-Open No. 2002-304996) discloses a storage device that uses particularly a compound having a cyclic nitroxide structure among nitroxide compounds as an electrode active material. In addition, the polyradical compound used as the electrode active material therein is synthesized by reacting 2,2,6,6-tetramethyl piperidine methacrylate with azobisisobutyronitrile, which is a polymerization initiator to conduct polymerization, subsequently oxidizing the polymer with m-chloroperbenzoic acid. On the other hand, Patent Document 6 (Japanese Patent Application Laid-Open No. 2002-313344) discloses a battery using a nitroxyl radical polymer, which is a polyradical compound, as a binder for an electrode.

By the way, as a method for synthesizing a vinyl ether monomer, known methods are: a method of reacting acetylene with an corresponding alcohol at a high temperature (180 to 200° C.) under increased pressure (about 20 to 50 atm) in the presence of catalytic amounts of potassium hydroxide and sodium hydroxide (Non-Patent Document 1: W. Reppe et al, Annalen der Chemie (Ann.), vol. 601 (1956), p. 81-111); a method of heating and refluxing an corresponding alcohol and alkyl vinyl ether in the presence of mercuric acetate catalyst (Non-Patent Document 2: Warren H. et al, Journal of The American Chemical Society, vol. 79 (1957), p. 2828-2833); and a method of heating and refluxing an corresponding alcohol and vinyl acetate in the presence of iridium catalyst (Non-Patent Document 3: Yasutaka Ishii et al, Journal of The American Chemical Society, vol. 124 (2002), p. 1590-1591; and Patent Document 7: Japanese Patent Application Laid-Open No. 2003-73321).

Patent Document 1: U.S. Pat. No. 4,833,048
Patent Document 2: Japanese Patent No. 2,715,778
Patent Document 3: U.S. Pat. No. 4,442,187
Patent Document 4: Japanese Patent Application Laid-Open No. 2002-151084
Patent Document 5: Japanese Patent Application Laid-Open No. 2002-304996
Patent Document 6: Japanese Patent Application Laid-Open No. 2002-313344
Patent Document 7: Japanese Patent Application Laid-Open No. 2003-73321
Non-Patent Document 1: W. Reppe et al, Annalen der Chemie (Ann.), vol. 601, p. 81-111 (1956)
Non-Patent Document 2: Warren H. et al, Journal of The American Chemical Society, vol. 79, p. 2828-2833 (1957)
Non-Patent Document 3: Yasutaka Ishii et al, Journal of The American Chemical Society, vol. 124, p. 1590-1591 (2002)

DISCLOSURE OF THE INVENTION

Problem to be Solved by the Invention

As described above, in lithium ion batteries that use transition metal oxides for cathodes, it is difficult to manufacture a battery that has a high energy density per weight and produces a large output. In addition, the electric double layer capacitor produces a large output, but the capacitor has a low energy density per weight and it is difficult to make the capacitor to have a large capacity. Furthermore, batteries that use a sulfur compound or a conductive organic compound as an electrode active material have not provided a battery that has a high energy density yet. In addition, batteries that use oxidation-reduction reactions of organic radical compounds have a problem that it is not easy to manufacture the batteries because some manufacturing methods of the batteries can cause cracks in electrodes. Therefore, there have been demanded an easy and novel process for manufacturing an electrode, and a novel material that makes the process easy. In addition, a material that has a higher energy density has also been demanded.

An object of the present invention is to provide an electrode active material that has a high capacity density and from which a large current can be extracted; and a battery that has a high energy density and produces a large output. In addition, another object of the present invention is to provide a method for manufacturing a polyradical compound that can be used as an electrode active material.

Means for Solving the Problem

The inventors of the present invention have thoroughly examined. As a result, the inventors have found that the above-mentioned problems can be solved when a specific organic compound that have not been used as electrode active materials, that is, a polyradical compound having a partial structure represented by the following general formula (2) in a molecule, is used as an electrode active material. Thus, the present invention provides a novel battery that has a high energy density and produces a large output (more specifically that can discharge a large current) by using a polyradical compound having a partial structure represented by the following general formula (2) in a molecule as an electrode active material and by utilizing an oxidation-reduction reaction of the partial structure.

Therefore, the present invention is an electrode active material, comprising a polyradical compound having a partial structure represented by the following general formula (2):

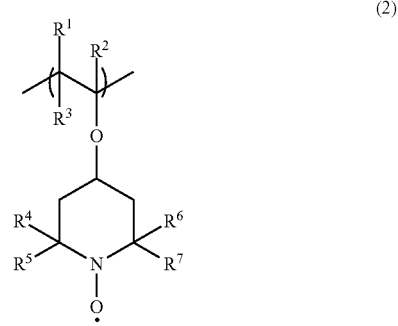

(2)

wherein, in the general formula (2), $R^1$ to $R^3$ independently represent a hydrogen atom or a methyl group; and $R^4$ to $R^7$ independently represent an alkyl group having 1 to 3 carbon atoms.

In a battery according to the present invention, the polyradical compound having a partial structure represented by the general formula (2) performs an oxidation-reduction reaction shown in the following scheme (I) or (II) in the course of charging and discharging. In the oxidation-reduction reaction of the scheme (I), in the case of using the polyradical compound having a partial structure represented by the general formula (2) as a cathode, the structure in the state of (A) changes to the state of (B) with emitting electrons by charging. By discharging, the structure in the state of (B) changes to the state of (A) with accepting electrons. In addition, in the oxidation-reduction reaction of the scheme (II), in the case of using the polymer as a cathode, the structure in the state of (C) changes to the state of (A) with emitting electrons by charging. By discharging, the structure in the state of (A) changes to the state of (C) with accepting electrons. Charging and discharging are preferably conducted by using the oxidation-reduction of the scheme (I) in view of stability of the oxidation-reduction reaction of the polymer.

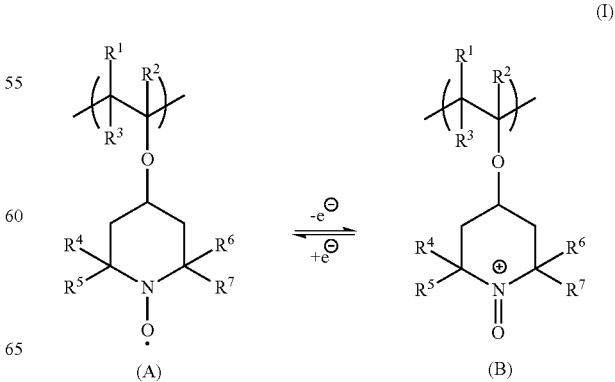

(I)

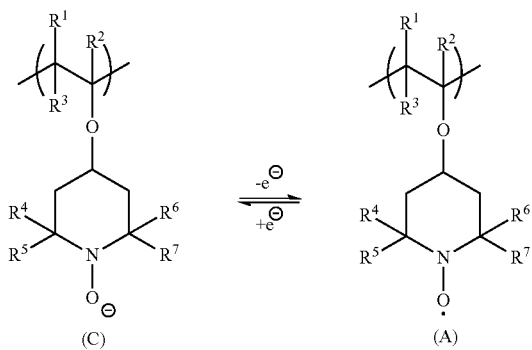

(II)             (C)            (A)

An electrode active material in a battery is oxidized or reduced by charging and discharging, and thus the electrode active material is in either starting state or reduced state. In the present invention, the electrode active material has the structure represented by the general formula (2) in either charged state or discharged state.

The present invention has been accomplished by finding that the polyradical compound having a partial structure represented by the general formula (2) is excellent as an electrode active material. This is because the polyradical compound having a partial structure represented by the general formula (2) almost does not cause side reactions and performs an oxidation-reduction reaction that is reversible with almost 100% ratio stability. Thus, a battery that uses the polyradical compound having a partial structure represented by the general formula (2) as an electrode active material can charge and discharge stably, and such a battery has an excellent cycle property. In addition, a battery that uses the polyradical compound having a partial structure represented by the general formula (2) as an electrode active material has a more excellent high-output property than a conventional lithium ion battery. This is because the polyradical compound having a partial structure represented by the general formula (2) has a substituent group that exhibits a high electrode reaction rate, thereby discharging a large current at one time. Furthermore, the polyradical compound having a partial structure represented by the general formula (2) can be consisted of small mass elements of carbon, nitrogen, hydrogen, and oxygen. Therefore, the weight of an electrode active material can be reduced, and an electrode manufactured with the electrode active material has a high capacity density per unit weight. As a result, manufacturing a battery with the electrode active material provides a battery that has a high energy density per weight.

In addition, in the present invention, it is sufficient that the polyradical compound having a partial structure represented by the general formula (2) directly contributes to an electrode reaction either in a cathode or anode. And an electrode in which the polyradical compound is used as an electrode active material is not limited to a cathode or anode. Incidentally, in view of energy density, it is particularly preferable to use the polyradical compound having a partial structure represented by the general formula (2) as a cathode active material. In addition, in point of obtaining a high voltage and a large capacity, a battery according to the present invention is preferably a lithium battery, particularly preferably a lithium secondary battery, which has a carbon anode into which metallic lithium or lithium ions can be inserted and eliminated.

Incidentally, the polyradical compound that is used in the present invention as an electrode active material can be preferably manufactured according to the following methods. That is, the present invention is a method for manufacturing a polyradical compound, polymerizing at least a radical substituted vinyl ether compound represented by the following general formula (1) in the presence of a cationic polymerization catalyst to obtain a polyradical compound having a partial structure represented by the following general formula (2),

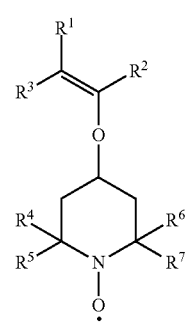

(1)

wherein, in the general formula (1), $R^1$ to $R^3$ independently represent a hydrogen atom or a methyl group; and $R^4$ to $R^7$ independently represent an alkyl group having 1 to 3 carbon atoms,

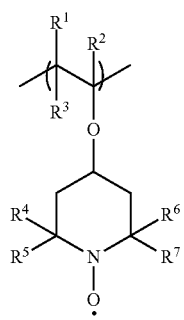

(2)

wherein, in the general formula (2), $R^1$ to $R^3$ independently represent a hydrogen atom or a methyl group; and $R^4$ to $R^7$ independently represent an alkyl group having 1 to 3 carbon atoms.

Effects of the Invention

The present invention has proposed an electrode active material containing a polyradical compound having a partial structure represented by the general formula (2) and a novel battery using the electrode active material. Thus, the present invention provides an electrode active material that has a high capacity density and from which a large current can be extracted; and a battery that has a high energy density and produces a large output. Therefore, the present invention makes it possible to manufacture a battery composed of an electrode active material that contains light and safe elements and does not contain heavy metals. The present invention also realizes a battery that has a large capacity (per weight), exhibits excellent stability in charging and discharging cycles, and further produces a large output. In addition, the present invention provides a method for manufacturing the polyradical compound.

BRIEF DESCRIPTION OF THE DRAWINGS

FIG. 1 is a schematic view showing an embodiment of the structure of a battery according to the present invention.

DESCRIPTION OF SYMBOLS 1 aluminum exterior housing
2 insulating gasket
3 anode collector
4 anode
5 separator
6 cathode
7 cathode collector

BEST MODE FOR CARRYING OUT THE INVENTION

FIG. 1 shows the structure of an embodiment of a battery according to the present invention. The battery shown in FIG. 1 has the structure in which a cathode 6 is laminated, via a separator 5 containing an electrolyte, with an anode 4 which is placed on an anode collector 3 to oppose each other; and a cathode collector 7 is laminated on the cathode 6. This structure is packed with an aluminum exterior housing 1 on the anode side and an aluminum exterior housing 1 on the cathode side. Between the aluminum exterior housings is placed an insulating gasket 2 made of an insulating material such as plastic resins for the purpose of avoiding electrical contact between the aluminum exterior housings. Incidentally, in the case of using a solid electrolyte or a gel electrolyte as the electrolyte, such an electrolyte instead of the separator 5 may lie between the electrodes may be laminated via such an electrolyte instead of the separator 5.

In the present invention, in the structure mentioned above, an electrode active material that is used for the anode 4 or the cathode 6 or both electrodes is characterized by containing a polyradical compound having a partial structure represented by the general formula (2) that will be described later.

The battery according to the present invention is preferably a lithium battery or particularly a lithium secondary battery using the electrode active material as a cathode active material in view of battery capacity.

<1> Electrode Active Material

An electrode active material for an electrode in the present invention denotes a material that directly contributes to an electrode reaction such as a charging reaction and a discharging reaction, and plays a key role in a battery system.

In the present invention, an electrode active material that contains a polyradical compound having a partial structure represented by the general formula (2) is used as an electrode active material,

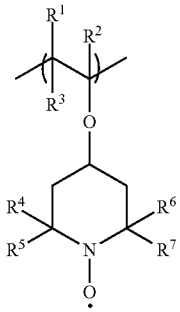

wherein, in the general formula (2), $R^1$ to $R^3$ independently represent a hydrogen atom or a methyl group; and $R^4$ to $R^7$ independently represent an alkyl group having 1 to 3 carbon atoms.

In the general formula (2), it is preferable that $R^4$ to $R^7$ independently represent a methyl group or an ethyl group.

In a battery according to the present invention, the electrode active material may be fixed to an electrode, or dissolved or dispersed in an electrolyte. Incidentally, in the case of using the electrode active material being fixed to an electrode, for the purpose of preventing decrease of capacity by dissolution of the electrode active material to an electrolyte solution, the electrode active material is preferably solid and insoluble or has a low degree of solubility in the electrolyte solution. In this case, the electrode active material may swell as long as the material is insoluble or has a low degree of solubility in the electrolyte solution. When the electrode active material has a high degree of solubility in the electrolyte solution, elution of the material from the electrode to the electrolyte solution may decrease capacity through charging and discharging cycles.

Therefore, the polyradical compound having a partial structure represented by the general formula (2) preferably has a number average molecular weight of 500 or higher, more preferably 5000 or higher, still more preferably 10,000 or higher, particularly preferably 40,000 or higher and most preferably 70,000 or higher. This is because the polyradical compound having a number average molecular weight of 500 or higher is less prone to dissolve in an electrolyte solution for batteries, and the polyradical compound having a number average molecular weight of 5000 or higher is almost insoluble in an electrolyte solution for batteries. The polyradical compound may have either a linear, branched or network structure. There is not particularly the upper limit of the number average molecular weight, but in view of convenience for synthesis, it is suitable to use a polyradical compound preferably having a number average molecular weight of 5,000,000 or less, more preferably 1,000,000 or less, still more preferably 200,000 or less, and particularly preferably 100,000 or less. In addition, the polyradical compound may have a crosslinked structure obtained by using a crosslinker. Incidentally, the number average molecular weight denotes a value obtained by using GPC in which dimethyl formamide (DMF) is used as an eluant to measure soluble matter in DMF of the sample.

The polyradical compound having a partial structure represented by the general formula (2) preferably has a glass transition temperature of 80° C. or higher, more preferably 100° C. or higher, and still more preferably 130° C. or higher, in view of convenience for electrode manufacturing processes, conditions for use, and the like. There is not particularly the upper limit of the glass transition temperature, but the glass transition temperature is preferably 250° C. or less, more preferably 200° C. or less, still more preferably 180° C. or less, and particularly preferably 150° C. or less.

As the polymer, a homopolymer having only a partial structure represented by the general formula (2) may be used, or a copolymer further having another partial structure may be used. In view of convenience for synthesis, the homopolymer is preferably used. In the case of using the copolymer, the copolymer preferably contains 70 to 99 mol % of the partial structure represented by the general formula (2) to the total of the polymer, and more preferably 80 to 95 mol %.

Examples of the polyradical compound having a partial structure represented by the general formula (2) include polyradical compounds having partial structures represented by the following general formulae (4) to (13):

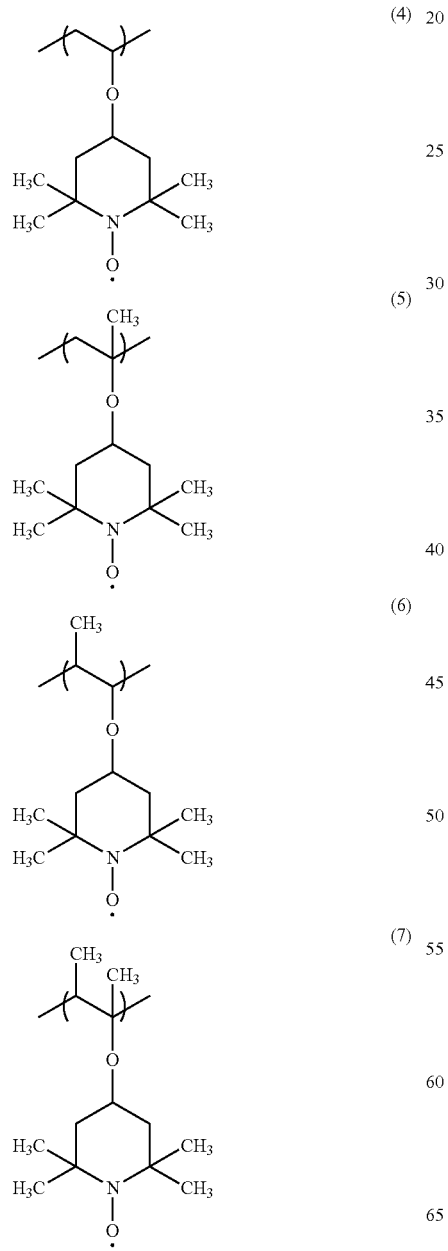

(4)
(5)
(6)
(7)

-continued

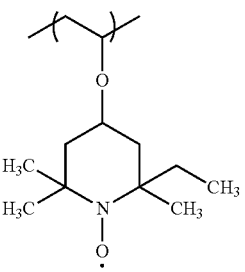

(8)
(9)

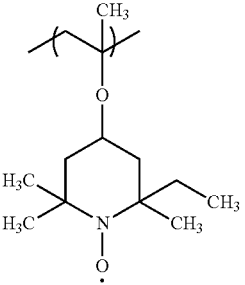

(10)

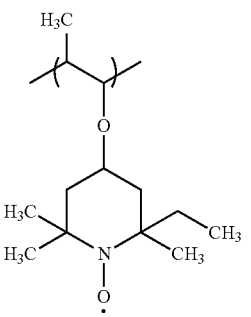

(11)

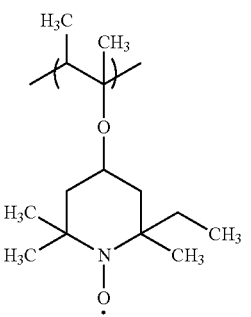

(12)

(13)

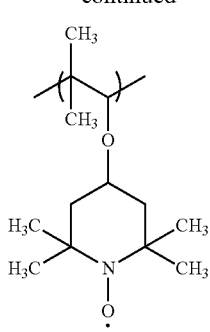

The polyradical compound having a partial structure represented by the above formula (4) can be synthesized, for example, by the route shown in the following synthetic scheme (14). More specifically, the polyradical compound can be synthesized by a method of polymerizing a radical substituted vinyl ether compound in the presence of a cationic polymerization catalyst to conduct cationic polymerization. The polyradical compound can be synthesized by polymerizing 2,2,6,6-tetramethyl piperidine-4-vinyloxy-1-oxyl, using, for example, boron trifluoride diethyl ether complex as the cationic polymerization catalyst. Furthermore, the polyradical compounds represented by the formulae (5) to (13) can be synthesized by similar methods.

(14)

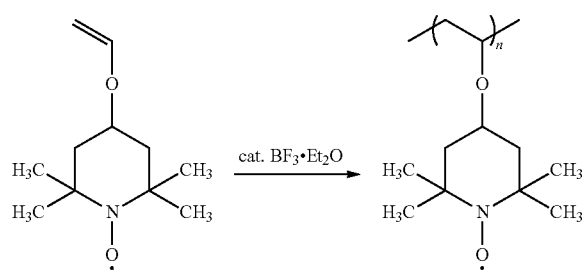

In addition, as the cationic polymerization catalyst that is used for the polymerization, catalysts that are generally used for cationic polymerization may be used other than those mentioned above, but a Lewis acid is preferably used. It is also possible to use a protonic acid as the cationic polymerization catalyst, but in that case, the polymerization is preferably conducted under the condition where the protonic acid does not cause a side reaction with a monomer containing a radical. As the Lewis acid, aluminum chloride, tin tetrachloride, iron chloride, and the like may be used. Furthermore, there may be used combined catalysts of a transition-metal compound such as tin tetrachloride, titanium tetrachloride, titanium trichloride, vanadium tetrachloride, or vanadium oxide trichloride; and an organometallic compound having a typical metal such as triethyl aluminum, ethyl aluminum dichloride, triethyl oxonium, or hexafluoro borate. In that case, the target polyradical compound can be synthesized by properly changing synthetic scheme, materials to be used, reaction conditions, and the like, and combining known synthetic techniques. The polymerization is preferably conducted in an organic solvent. In addition, in view of solubility of a monomer, the polymerization is preferably conducted in a halogenated organic solvent. As the halogenated organic solvent, dichloromethane or chloroform is preferably used.

Incidentally, a vinyl ether monomer that is used for synthesizing the polyradical compound can be synthesized by the following methods. For example, as disclosed in W. Reppe et al, Annalen der Chemie (Ann.), vol. 601 (1956), p. 81-111, the vinyl ether monomer can be synthesized by reacting acetylene with an corresponding alcohol at a high temperature (180 to 200° C.) under increased pressure (about 20 to 50 atm) in the presence of catalytic amounts of potassium hydroxide and sodium hydroxide. In addition, as disclosed in Warren H. et al, Journal of The American Chemical Society, vol. 79 (1957), p. 2828-2833, the vinyl ether monomer can be synthesized by heating and refluxing an corresponding alcohol and alkyl vinyl ether in the presence of mercuric acetate catalyst. Furthermore, as disclosed in Ishii Yasutaka et al, Journal of The American Chemical Society, vol. 124 (2002), p. 1590-1591; and Japanese Patent Application Laid-Open No. 2003-73321, the vinyl ether monomer can also be synthesized by heating and refluxing an corresponding alcohol and vinyl acetate in the presence of iridium catalyst.

In addition, as an electrode active material of one electrode of a battery according to the present invention, the polyradical compound having a partial structure represented by the general formula (2) may be used alone or in combination of two or more of the polyradical compounds. Furthermore, the polyradical compound may be used in combination with another electrode active material. In this case, the electrode active material preferably contains 10 to 90 wt % of the polyradical compound having a partial structure represented by the general formula (2), and more preferably 20 to 80 wt %.

When the polyradical compound having a partial structure represented by the general formula (2) is used for a cathode, examples which can be combined as another electrode active material may include metallic oxides, disulfide compounds, other stable radical compounds, and conductive polymers. Examples of the metallic oxides may include: lithium manganates such as $LiMnO_2$ and $Li_xMn_2O_4$ (0<x<2), lithium manganates having Spinel structure, $MnO_2$, $LiCoO_2$, $LiNiO_2$, $Li_yV_2O_5$ (0<y<2), olivine materials $LiFePO_4$, and materials in which a part of Mns in Spinel structure are substituted with another transition metal such as $LiNi_{0.5}Mn_{1.5}O_4$, $LiCr_{0.5}Mn_{1.5}O_4$, $LiCo_{0.5}Mn_{1.5}O_4$, $LiCoMnO_4$, $LiNi_{0.5}Mn_{0.5}O_2$, $LiNi_{0.33}Mn_{0.33}Co_{0.33}O_2$, $LiNi_{0.8}Co_{0.2}O_2$, and $LiN_{0.5}Mn_{1.5-z}Ti_zO_4$ (0<z<1.5). Examples of the disulfide compounds may include: dithioglycol, 2,5-dimercapto-1,3,4-thiadiazole, and S-triazine-2,4,6-trithiol. Examples of the other stable radical compounds may include poly(2,2,6,6-tetramethyl piperidinoxyl-4-yl methacrylate). Examples of the conductive polymers may include: polyacetylene, polyphenylene, polyaniline, and polypyrrole. Among the above compounds, lithium manganates or $LiCoO_2$ is particularly preferably combined. In the present invention, these other electrode active materials may be used alone or in combination of two or more of the materials.

When the polyradical compound having a partial structure represented by the general formula (2) is used for an anode, examples which can be combined as another electrode active material may include graphite, amorphous carbon, metallic lithium, lithium alloy, lithium ion absorbed carbon, metallic sodium, and conductive polymers. And other stable radical compounds may also be used. Examples of the other stable radical compounds may include poly(2,2,6,6-tetramethyl piperidinoxyl-4-yl methacrylate). The shapes of the above materials are not particularly limited. For example, metallic lithium is not limited to have the shape of a thin film, and may be a bulk material, a compressed powder, a fiber, a flake, and the like. Among the above compounds, metallic lithium or graphite is particularly preferably combined. In the present invention, these other electrode active materials may be used alone or in combination of two or more of the materials.

The battery according to the present invention uses the polyradical compound having a partial structure represented by the general formula (2) as an electrode active material in an electrode reaction either in a cathode or an anode, or in electrode reactions in both of a cathode and an anode. When the polyradical compound is used as an electrode active material in an electrode reaction in one electrode, as an electrode active material in the other electrode, a conventionally known electrode active material such as the above materials can be used. These electrode active materials may be used alone or in combination of two or more of the materials. And at least one of these electrode active materials and the polyradical compound having a partial structure represented by the general formula (2) may be combined and used. In addition, the polyradical compound having a partial structure represented by the general formula (2) may also be used alone.

In the present invention, it is sufficient that the polyradical compound having a partial structure represented by the general formula (2) directly contributes to an electrode reaction either in a cathode or an anode. And an electrode in which the polyradical compound is used as an electrode active material is not limited to a cathode or an anode. Incidentally, in view of energy density, it is particularly preferable to use the polyradical compound having a partial structure represented by the general formula (2) as a cathode active material. In this case, as the cathode active material, it is preferable to use the polyradical compound having a partial structure represented by the general formula (2) alone. Incidentally, the polyradical compound may be combined with another cathode active material and used. The other cathode active material is preferably lithium manganates or $LiCoO_2$. In addition, in the case of using the cathode active material, metallic lithium or graphite is preferably used as the anode active material.

<2> Conductivity Imparting Agent (Auxiliary Conductive Material) and Ionic Conduction Auxiliary Material In the case of forming an electrode with the polyradical compound represented by the general formula (2), for the purpose of decreasing impedance and increasing energy density and output property, a conductivity imparting agent (auxiliary conductive material) or an ionic conduction auxiliary material may be mixed with the polyradical compound. As for these materials, examples of the auxiliary conductive material may include: carbonaceous particulates such as graphite, carbon black, and acetylene black; carbon fibers such as Vapor Grown Carbon Fiber (VGCF) or carbon nanotube; and conductive polymers such as polyaniline, polypyrrole, polythiophene, polyacetylene, and polyacenes. Examples of the ionic conduction auxiliary material may include polymer gel electrolytes and polymer solid electrolytes. Among these, a carbon fiber is preferable mixed. Mixing a carbon fiber further increases the tensile strength of an electrode, which reduces the possibility that cracking occurs in the electrode or the electrode comes off. More preferably, Vapor Grown Carbon Fiber is mixed. These materials may be used alone or in combination of two or more of the materials. Preferred ratio of the materials in an electrode is 10 to 80 wt %.

<3> Binder

For the purpose of increasing the bonding strength among components of an electrode, binders may be used. Examples of the binders may include resin binders such as polytetrafluoroethylene, polyvinylidene fluoride, vinylidene fluoride-hexafluoropropylene copolymer, vinylidene fluoride-tetrafluoroethylene copolymer, styrene butadiene copolymer rubber, polypropylene, polyethylene, polyimide, and various kinds of polyurethanes. These resin binders may be used alone or in combination of two or more of the resin binders. Preferred ratio of the resin binders in an electrode is 5 to 30 wt %.

<4> Catalyst

For the purpose of conducting an electrode reaction more smoothly, catalysts that promote an oxidation reduction reaction may be used. Examples of the catalysts may include: conductive polymers such as polyaniline, polypyrrole, polythiophene, polyacetylene, polyacenes; basic compounds such as pyridine derivatives, pyrrolidone derivatives, benzimidazole derivatives, benzthiazole derivatives, and acridine derivatives; and metallic ion complexes. These catalysts may be used alone or in combination of two or more of the catalysts. Preferred ratio of the catalysts in an electrode is 10 wt % or less.

<5> Collector and Separator

As an anode collector and a cathode collector, there may be used a collector having a shape of foil, metallic flat plate, mesh, or the like that is made of nickel, aluminum, copper, gold, silver, aluminum alloy, stainless, carbon or the like. In addition, the collector may have catalytic effect, or an electrode active material and the collector may be chemically bonded.

On the other hand, for the purpose of avoiding contact between the cathode and the anode, there may be used a separator such as porous films made of polyethylene, polypropylene, or the like, or a nonwoven fabric.

<6> Electrolyte

In the present invention, the electrolyte transports charged carriers between an anode and a cathode, and generally it is preferable that the electrolyte has an ionic conductivity of $10^{-5}$ to $10^{-1}$ S/cm at 20° C. As the electrolyte, for example, there may be used an electrolyte solution in which an electrolyte salt is dissolved in a solvent. As the electrolyte salt, there may be used a conventionally known material such as $LiPF_6$, $LiClO_4$, $LiBF_4$, $LiCF_3SO_3$, $Li(CF_3SO_2)_2N$, $Li(C_2F_5SO_2)_2N$, $Li(CF_3SO_2)_3C$, or $Li(C_2F_5SO_2)_3C$. These electrolyte salts may be used alone or in combination of two or more of the electrolyte salts.

In addition, in the case of using a solvent for an electrolyte solution, there may be used, as the solvent, an organic solvent such as ethylene carbonate, propylene carbonate, dimethyl carbonate, diethyl carbonate, methyl ethyl carbonate, γ-butyrolactone, tetrahydrofuran, dioxolane, sulfolane, dimethylformamide, dimethylacetamide, or N-methyl-2-pyrrolidone. These solvents may be used alone or in combination of two or more of the solvents.

Furthermore, in the present invention, as the electrolyte may be used a solid electrolyte. Examples of polymers used for the solid electrolyte may include: vinylidene fluoride polymers such as polyvinylidene fluoride, vinylidene fluoride-hexafluoropropylene copolymer, vinylidene fluoride-ethylene copolymer, vinylidene fluoride-monofluoroethylene copolymer, vinylidene fluoride-trifluoroethylene copolymer, vinylidene fluoride-tetrafluoroethylene copolymer, and vinylidene fluoride-hexafluoropropylene-tetrafluoroethylene terpolymer; acrylonitrile polymers such as acrylonitrile-methyl methacrylate copolymer, acrylonitrile-methyl acrylate copolymer, acrylonitrile-ethyl methacrylate copolymer, acrylonitrile-ethyl acrylate copolymer, acrylonitrile-methacrylic acid copolymer, acrylonitrile-acrylic acid copolymer, and acrylonitrile-vinyl acetate copolymer; polyethylene oxide, ethylene oxide-propylene oxide copolymer, acrylate polymers thereof, and methacrylate polymers thereof. There may also be used a gel electrolyte in which the polymers contain an electrolyte solution, or the polymers just containing an electrolyte salt.

<7> Battery Form

In the present invention, battery form is not particularly limited, and conventionally known form may be used. Examples of the battery forms may include a form in which an electrode stack and a form in which a rolled electrode is sealed with a metallic case, a resin case, or a laminated film made of a metallic foil such as an aluminum foil and a synthetic resin film, which is manufactured in the form of a cylinder, a rectangle, a coin, a sheet, or the like. However, the present invention is not limited thereto.

<8> Manufacturing Method of Battery

As a method for manufacturing a battery is not particularly limited, and a properly selected method may be used depending on materials. For example, the method may be used, in which a solvent is added to an electrode active material, a conductivity imparting agent, and the like, to make a slurry; the slurry is applied to an electrode collector, and the solvent is evaporated by heating or in a room temperature to manufacture an electrode; furthermore, the electrodes are opposed each other via a separator by laminating or rolling the electrodes which are packed with exterior housings; an electrolyte solution is poured thereto; and the battery is sealed. Examples of the solvents to make the slurry may include: ether solvents such as tetrahydrofuran, diethyl ether, and ethylene glycol dimethyl ether; amine solvents such as N,N-dimethylformamide, and N-methyl pyrrolidone; aromatic hydrocarbon solvents such as benzene, toluene, and xylene; aliphatic hydrocarbon solvents such as hexane and heptane; halogenated hydrocarbon solvents such as chloroform, dichloromethane, dichloroethane, trichloroethane, and carbon tetrachloride; alkyl ketone solvents such as acetone and methyl ethyl ketone; alcohol solvents such as methanol, ethanol, and isopropyl alcohol; and dimethylsulfoxide. In addition, there is another method for manufacturing an electrode in which an electrode active material, a conductivity imparting agent, and the like are subjected to dry kneading and processed into a thin film and the thin film is laminated on an electrode collector. In manufacturing an electrode, particularly in the case of employing a method in which a solvent is added to an organic electrode active material, a conductivity imparting agent, and the like, to make a slurry; the slurry is applied to an electrode collector, and the solvent is evaporated by heating or in a room temperature to manufacture an electrode, the electrode tends to come off, become cracked or the like. Manufacturing an electrode preferably having a thickness of from 80 μm to 500 μm by using the polyradical compound having a partial structure represented by the general formula (2) according to the present invention has an advantages that the electrode is less prone to come off, become cracked or the like, and an uniform electrode is manufactured.

In manufacturing a battery, there is a case of manufacturing a battery by using the polyradical compound itself represented by the general formula (2) as an electrode active material, and a case of manufacturing a battery by using a polymer that is changed into the polyradical compound represented by the general formula (2) by an electrode reaction. Examples of the polymer that is changed into the polyradical compound represented by the general formula (2) by an electrode reaction may include: lithium salts or sodium salts composed of an anion obtained by reducing the polyradical compound represented by the general formula (2) and an electrolyte cation such as lithium ion or sodium ion; and salts composed of a cation obtained by oxidizing the compound represented by the general formula (2) and an electrolyte anion such as $PF_6^-$ or $BF_4^-$.

In the present invention, other manufacturing conditions such as taking out a lead from the electrode and packing may be conducted according to a conventionally known method as a method for manufacturing a battery.

EXAMPLES

Hereafter, the present invention will be explained in detail with referring to Synthetic Examples and Examples. However, the present invention is not limited thereto.

Synthetic Example 1

A polyradical compound having a partial structure represented by the following formula (14) was synthesized by the following synthetic scheme (15).

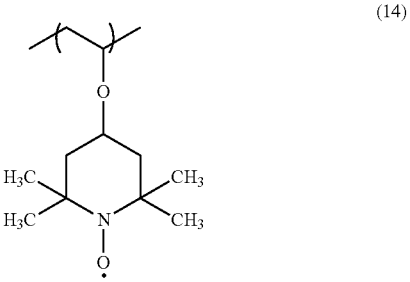

<1> Synthesis (1) of poly(2,2,6,6-tetramethyl piperidine-4-vinyloxy-1-oxyl)

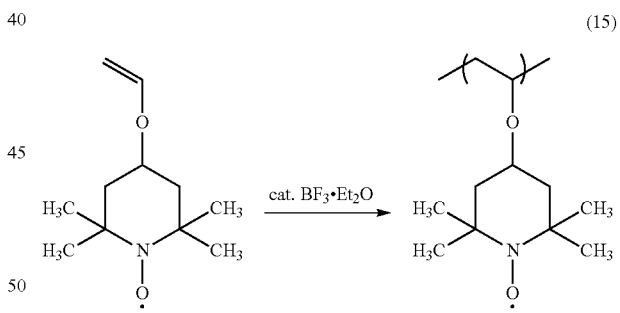

In an atmosphere of argon, to a 200 mL three-necked round-bottom flask were added 10.0 g (50.4 mmol) of 2,2,6, 6-tetramethyl piperidine-4-vinyloxy-1-oxyl (monomer) and 100 mL of dichloromethane, and was cooled to −78° C. Furthermore, 280 mg (2 mmol) of boron trifluoride diethyl ether complex was added thereto and homogenized, and then the reaction was carried out at −78° C. for 20 hours. After the reaction was complete, the reaction mixture was allowed to warm to room temperature. Then thus-obtained solid material was filtered off, washed with methanol several times, and dried in vacuum to obtain poly(2,2,6,6-tetramethyl piperidine-4-vinyloxy-1-oxyl) [polyradical compound (a-1)] (yield: 70%) as a red solid. When IR spectrum of the obtained polyradical compound (a-1) was measured, peaks at 966 and 674 ($cm^{-1}$) were lost, which are derived from a vinyl group and were observed in the monomer. In addition, when the molecular weight of soluble part in DMF of the polyradical compound (a-1) was measured by GPC, thus obtained values were the number average molecular weight Mn=89,000, and distribution Mw/Mn=2.7. The spin density of the polyradical compound (a-1) measured with ESR spectrum was $3.05 \times 10^{21}$ spin/g. This value is in close agreement with the spin concentration based on the assumption that all radicals in the polymer are not deactivated by polymerization and exist as radicals. And the glass transition temperature of the polyradical compound (a-1) was measured to be 132° C.

Synthetic Example 2

A polyradical compound having a partial structure represented by the above formula (14) was synthesized by the following synthetic scheme (16).

<2> Synthesis (2) of poly(2,2,6,6-tetramethyl piperidine-4-vinyloxy-1-oxyl)

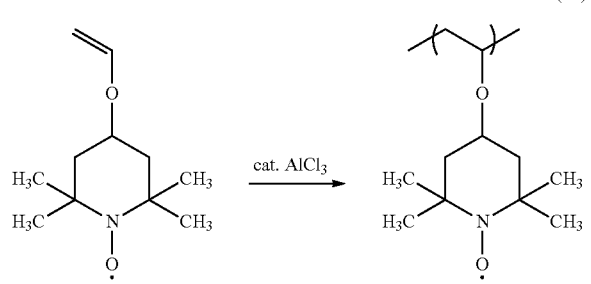

(16)

In an atmosphere of argon, to a 200 mL three-necked round-bottom flask were added 10.0 g (50.4 mmol) of 2,2,6, 6-tetramethyl piperidine-4-vinyloxy-1-oxyl (monomer) and 100 mL of dichloromethane, and was cooled to −78° C. Furthermore, 270 mg (2 mmol) of aluminum chloride was added thereto and homogenized, and then the reaction was carried out at −78° C. for 20 hours. After the reaction was complete, the reaction mixture was allowed to warm to room temperature. Then thus-obtained solid matter was filtered off, washed with methanol several times, and dried in vacuum to obtain poly (2,2,6,6-tetramethyl piperidine-4-vinyloxy-1-oxyl) [polyradical compound (a-2)] (yield: 72%) as a red solid. When IR spectrum of the obtained polyradical compound (a-2) was measured, peaks at 966 and 674 (cm$^{-1}$) were lost, which are derived from a vinyl group and were observed in the monomer. The structure of the obtained polyradical compound (a-2) was examined with IR spectrum. In addition, when the molecular weight of soluble part in DMF of the polyradical compound (a-2) was measured by GPC, thus obtained values were the number average molecular weight Mn=91,000, and distribution Mw/Mn=2.9. The spin density of the polyradical compound (a-2) measured with ESR spectrum was $3.05 \times 10^{21}$ spin/g. This value is in close agreement with the spin concentration based on the assumption that all radicals in the polymer are not deactivated by polymerization and exist as radicals. And the glass transition temperature of the polyradical compound (a-2) was measured to be 128° C.

Synthetic Example 3

A polyradical compound having a partial structure represented by the above formula (14) was synthesized by the following synthetic scheme (17).

<2> Synthesis (3) of poly(2,2,6,6-tetramethyl piperidine-4-vinyloxy-1-oxyl)

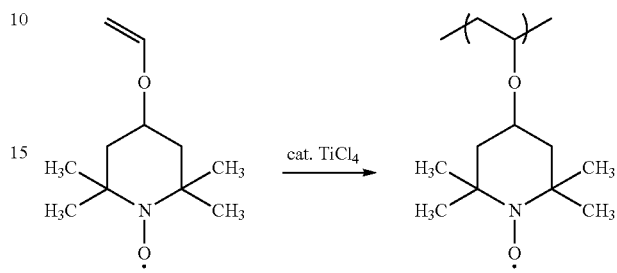

(17)

In an atmosphere of argon, to a 200 mL three-necked round-bottom flask were added 10.0 g (50.4 mmol) of 2,2,6, 6-tetramethyl piperidine-4-vinyloxy-1-oxyl (monomer) and 100 mL of dichloromethane, and was cooled to −78° C. Furthermore, 380 mg (2 mmol) of titanium tetrachloride was added thereto and homogenized, and then the reaction was carried out at −78° C. for 20 hours. After the reaction was complete, the reaction mixture was allowed to warm to room temperature. Then thus-obtained solid matter was filtered off, washed with methanol several times, and dried in vacuum to obtain poly(2,2,6,6-tetramethyl piperidine-4-vinyloxy-1-oxyl) [polyradical compound (a-3)] (yield: 66%) as a red solid. When IR spectrum of the obtained polyradical compound (a-3) was measured, peaks at 966 and 674 (cm$^{-1}$) were lost, which are derived from a vinyl group and were observed in the monomer. The structure of the obtained polyradical compound (a-3) was examined with IR spectrum. In addition, when the molecular weight of soluble part in DMF of the polyradical compound (a-3) was measured by GPC, thus obtained values were the number average molecular weight Mn=86,000, and distribution Mw/Mn=2.8. The spin density of the polyradical compound (a-3) measured with ESR spectrum was $3.05 \times 10^{21}$ spin/g. This value is in close agreement with the spin concentration based on the assumption that all radicals in the polymer are not deactivated by polymerization and exist as radicals. And the glass transition temperature of the polyradical compound (a-3) was measured to be 135° C.

Synthetic Example 4

A polyradical compound having a partial structure represented by the above formula (14) was synthesized by the following synthetic scheme (18).

<2> Synthesis (3) of poly(2,2,6,6-tetramethyl piperidine-4-vinyloxy-1-oxyl)

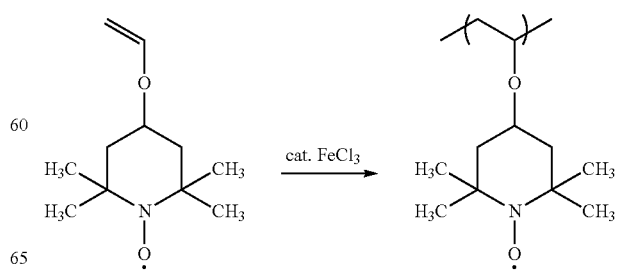

(18)

In an atmosphere of argon, to a 200 mL three-necked round-bottom flask were added 10.0 g (50.4 mmol) of 2,2,6, 6-tetramethyl piperidine-4-vinyloxy-1-oxyl (monomer) and 100 mL of dichloromethane, and was cooled to −78° C. Furthermore, 320 mg (2 mmol) of ferric chloride was added thereto and homogenized, and then the reaction was carried out at −78° C. for 20 hours. After the reaction was complete, the reaction mixture was allowed to warm to room temperature. Then thus-obtained solid matter was filtered off, washed with methanol several times, and dried in vacuum to obtain poly (2,2,6,6-tetramethyl piperidine-4-vinyloxy-1-oxyl) [polyradical compound (a-4)] (yield: 66%) as a red solid. When IR spectrum of the obtained polyradical compound (a-4) was measured, peaks at 966 and 674 (cm$^{-1}$) were lost, which are derived from a vinyl group and were observed in the monomer. The structure of the obtained polyradical compound (a-4) was examined with IR spectrum. In addition, when the molecular weight of soluble part in DMF of the polyradical compound (a-4) was measured by GPC, thus obtained values were the number average molecular weight Mn=87,000, and distribution Mw/Mn=2.6. The spin density of the polyradical compound (a-4) measured with ESR spectrum was $3.05 \times 10^{21}$ spin/g. This value is in close agreement with the spin concentration based on the assumption that all radicals in the polymer are not deactivated by polymerization and exist as radicals. And the glass transition temperature of the polyradical compound (a-4) was measured to be 130° C.

Synthetic Example 5

A polyradical compound having a partial structure represented by the following formula (19) was synthesized by the following synthetic scheme (20).

<3> Synthesis of poly[2,2,6,6-tetramethyl piperidine-4-(α-methyl)vinyloxy-1-oxyl]

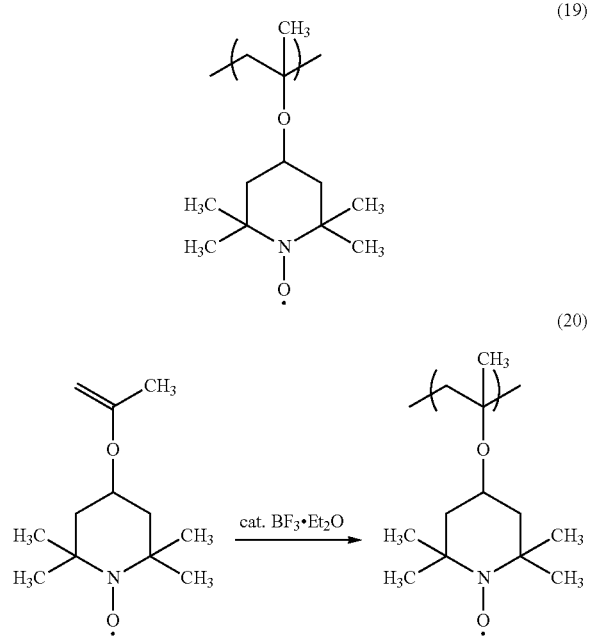

(19)

(20)

In an atmosphere of argon, to a 200 mL three-necked round-bottom flask were added 10.0 g (47.1 mmol) of 2,2,6, 6-tetramethyl piperidine-4-α-methyl)vinyloxy-1-oxyl (monomer) and 100 mL of dichloromethane, and was cooled to −78° C. Furthermore, 280 mg (2 mmol) of boron trifluoride-diethyl ether complex was added thereto and homogenized, and then the reaction was carried out at −78° C. for 20 hours. After the reaction was complete, the reaction mixture was allowed to warm to room temperature. Then thus-obtained solid matter was filtered off, washed with methanol several times, and dried in vacuum to obtain poly[2,2,6,6-tetramethyl piperidine-4-(α-methyl)vinyloxy-1-oxyl] [polyradical compound (b-1)] (yield: 65%) as a red solid. When IR spectrum of the obtained polyradical compound (b-1) was measured, peaks at 966 and 674 (cm$^{-1}$) were lost, which are derived from a vinyl group and were observed in the monomer. The structure of the obtained polyradical compound (b-1) was examined with IR spectrum. In addition, when the molecular weight of soluble part in DMF of the polyradical compound (b-1) was measured by GPC, thus obtained values were the number average molecular weight Mn=90,000, and distribution Mw/Mn=2.7. The spin density of the polyradical compound (b-1) measured with ESR spectrum was $2.84 \times 10^{21}$ spin/g. This value is in close agreement with the spin concentration based on the assumption that all radicals in the polymer are not deactivated by polymerization and exist as radicals. And the glass transition temperature of the polyradical compound (b-1) was measured to be 134° C.

Example 1

300 mg of the polyradical compound (a-1) synthesized in Synthetic Example 1, 60 mg of graphite powder, and 100 mg of polytetrafluoroethylene resin binder were weighed and kneaded with an agate mortar. After about 10 minutes dry mixing, thus-obtained mixture was subjected to roller drawing with being pressured to obtain a thin film having a thickness of about 150 μm. This film was dried in a vacuum overnight at 80° C. and stamped into the disk shape having a diameter of 12 mm to form an electrode for a coin battery. Incidentally, the electrode had a weight of 17.4 mg.

Next, thus-obtained electrode was immersed in an electrolyte solution to impregnate the electrolyte solution into voids of the electrode. As the electrolyte solution was used a mixed solution of ethylene carbonate/diethyl carbonate (in a mixed volume ratio of 3:7) containing 1.0 mol/L of LiPF$_6$ electrolyte salt. The electrolyte solution-impregnated electrode was placed on a cathode collector, and thereon was laminated a polypropylene porous film separator which was impregnated with the electrolyte solution. Furthermore, a lithium-clad copper foil to be an anode was laminated. With placing an insulating gasket around the laminate, aluminum exterior housings (manufactured by Hohsen) was placed on the cathode side and on the anode side respectively. The resultant was pressured with a swaging tool to provide an encapsulated type coin battery in which the polyradical compound (a-1) was used as a cathode active material, and metallic lithium was used as an anode active material.

Thus-manufactured coin battery was charged until the battery carried a voltage of 4.0V at a constant current of 0.1 mA, and then discharged until the battery carried a voltage of 3.0 V at a constant current of 0.1 mA. As a result, the voltage became almost constant at around 3.5 V for 6 hours and 30 minutes, and then dropped suddenly. The discharged capacity per the electrode active material was 129.0 mAh/g. In a similar way, charging and discharging were repeated 50 times in the range of 4.2 to 2.8 V. As a result, in all cases of the charging and discharging of 50 times, the voltage became constant at around 3.5 V, and (discharged capacity at 50th time)/(discharged capacity at 1st time) was 97.5%.

Then the coin battery was charged until the battery carried a voltage of 4.2 V at a constant current of 0.1 mA, and then discharged at a constant current of 5.0 mA. As a result, the voltage became constant at around 3.4 V, and then dropped suddenly. (Discharged capacity in discharging at 5.0 mA)/(discharged capacity in discharging at 0.1 mA) was 88.1%.

Example 2

20 g of N-methylpyrrolidone was weighed and placed in a miniature homogenizer container, 400 g of polyvinylidene fluoride was added thereto, and stirred for 30 minutes to dissolve the content completely. To the content was added 1.0 g of the polyradical compound (a-1) synthesized in Synthetic Example 1 and stirred for 5 minutes until the whole content became orange uniformly. To the content was added 600 mg of graphite powder, and further stirred for 15 minutes to obtain a slurry. Thus obtained slurry was applied to an aluminum foil and dried at 120° C. to form a cathode. The cathode had a thickness of 120 μm. No coming off, cracks or the like was observed in the formed electrode, and the surface of the electrode was uniform. The electrode was stamped into the disk shape having a diameter of 12 mm to form an electrode for a coin battery. Incidentally, the electrode had a weight of 15.6 mg.

Next, thus-obtained electrode was immersed in an electrolyte solution to impregnate the electrolyte solution into voids of the electrode. As the electrolyte solution was used a mixed solution of ethylene carbonate/diethyl carbonate (in a mixed volume ratio of 3:7) containing 1.0 mol/L of $LiPF_6$ electrolyte salt. The electrolyte solution-impregnated electrode was placed on a cathode collector (an aluminum foil), and thereon was a laminated polypropylene porous film separator which was impregnated with the electrolyte solution by a similar way. Furthermore, a copper foil that had a graphite layer on one side to be an anode was laminated. With placing an insulating gasket around the laminate, aluminum exterior housings (manufactured by Hohsen) was placed on the cathode side and on the anode side respectively. The resultant was pressured with a swaging tool to provide an encapsulated type coin battery in which the polyradical compound (a-1) was used as a cathode active material, and graphite was used as an anode active material.

Thus-manufactured coin battery was charged until the battery carried a voltage of 4.0 V at a constant current of 0.1 mA, and then discharged until the battery carried a voltage of 3.0 V at a constant current of 0.1 mA. As a result, the voltage became almost constant at around 3.5 V for 9 hours and 40 minutes, and then dropped suddenly. The discharged capacity per the electrode active material was 128.5 mAh/g. In a similar way, charging and discharging were repeated 50 times in the range of 4.2 to 2.8 V. As a result, in all cases of the charging and discharging of 50 times, the voltage became constant at around 3.5 V, and (discharged capacity at 50th time)/(discharged capacity at 1st time) was 96.2%.

Then the coin battery was charged until the battery carried a voltage of 4.2 V at a constant current of 0.1 mA, and then discharged at a constant current of 5.0 mA. As a result, the voltage became constant at around 3.4 V, and then dropped suddenly. (Discharged capacity in discharging at 5.0 mA)/(discharged capacity in discharging at 0.1 mA) was 90.2%.

Example 3

A coin battery was manufactured as with Example 2 except that the polyradical compound (a-2) synthesized in Synthetic Example 2 was used instead of the polyradical compound (a-1). No coming off, cracks or the like was observed in the formed electrode, and the surface of the electrode was uniform. The cathode of the coin battery had a weight of 13.2 mg.

Thus-manufactured coin battery was charged until the battery carried a voltage of 4.0 V at a constant current of 0.1 mA, and then discharged until the battery carried a voltage of 3.0 V at a constant current of 0.1 mA. As a result, a voltage plateau at around 3.5 V was observed for 8 hours and 10 minutes. The discharged capacity per the electrode active material was 127.6 mAh/g. Charging and discharging were repeated 50 times in the range of 4.0 to 3.0 V. As a result, (discharged capacity at 50th time)/(discharged capacity at 1st time) was 95.0%.

Then the coin battery was charged until the battery carried a voltage of 4.0 V at a constant current of 0.1 mA, and then discharged at a constant current of 5.0 mA. (Discharged capacity in discharging at 5.0 mA)/(discharged capacity in discharging at 0.1 mA) was 89.7%.

Example 4

A coin battery was manufactured as with Example 2 except that the polyradical compound (a-3) synthesized in Synthetic Example 3 was used instead of the polyradical compound (a-1). No coming off, cracks or the like was observed in the formed electrode, and the surface of the electrode was uniform. The cathode of the coin battery had a weight of 11.7 mg.

Thus-manufactured coin battery was charged until the battery carried a voltage of 4.0 V at a constant current of 0.1 mA, and then discharged until the battery carried a voltage of 3.0 V at a constant current of 0.1 mA. As a result, a voltage plateau at around 3.5 V was observed for 7 hours and 10 minutes. The discharged capacity per the electrode active material was 126.50 mAh/g. Charging and discharging were repeated 50 times in the range of 4.0 to 3.0 V. As a result, (discharged capacity at 50th time)/(discharged capacity at 1st time) was 90.6%.

Then the coin battery was charged until the battery carried a voltage of 4.0 V at a constant current of 0.1 mA, and then discharged at a constant current of 5.0 mA. As a result, (discharged capacity in discharging at 5.0 mA)/(discharged capacity in discharging at 0.1 mA) was 87.1%.

Example 5

A coin battery was manufactured as with Example 2 except that the polyradical compound (a-4) synthesized in Synthetic Example 4 was used instead of the polyradical compound (a-1). No coming off, cracks or the like was observed in the formed electrode, and the surface of the electrode was uniform. The cathode of the coin battery had a weight of 10.7 mg.

Thus-manufactured coin battery was charged until the battery carried a voltage of 4.0 V at a constant current of 0.1 mA, and discharged until the battery carried a voltage of 3.0 V at a constant current of 0.1 mA. As a result, a voltage plateau at around 3.5 V was observed for about 6 hours. The discharged capacity per the electrode active material was 124.60 mAh/g. Charging and discharging were repeated 50 times in the range of 4.0 to 3.0 V. As a result, (discharged capacity at 50th time)/(discharged capacity at 1st time) was 92.3%.

Then the coin battery was charged until the battery carried a voltage of 4.0 V at a constant current of 0.1 mA, and then discharged at a constant current of 5.0 mA. (Discharged capacity in discharging at 5.0 mA)/(discharged capacity in discharging at 0.1 mA) was 86.1%.

Example 6

A coin battery was manufactured as with Example 2 except that the polyradical compound (b-1) synthesized in Synthetic Example 5 was used instead of the polyradical compound (a-1). No coming off, cracks or the like was observed in the formed electrode, and the surface of the electrode was uniform. The cathode of the coin battery had a weight of 13.2 mg.

Thus-manufactured coin battery was charged until the battery carried a voltage of 4.0 V at a constant current of 0.1 mA, and then discharged until the battery carried a voltage of 3.0 V at a constant current of 0.1 mA. As a result, a voltage plateau at around 3.5 V was observed for 7 hours and 40 minutes. The discharged capacity per the electrode active material was 118.7 mAh/g. Charging and discharging were repeated 50 times in the range of 4.0 to 3.0 V. As a result, (discharged capacity at 50th time)/(discharged capacity at 1st time) was 90.6%.

Then the coin battery was charged until the battery carried a voltage of 4.0 V at a constant current of 0.1 mA, and then discharged at a constant current of 5.0 mA. (Discharged capacity in discharging at 5.0 mA)/(discharged capacity in discharging at 0.1 mA) was 86.1%.

Comparative Example 1

A coin battery was manufactured by the method as with Example 1 except that the used amount of graphite powder was increased to 900 mg instead of using the polyradical compound (a-1).

Thus-manufactured battery was subjected to charging and discharging as with Example 1. As a result, a voltage plateau was not observed at the time of discharging and the voltage dropped suddenly. Thus the battery did not satisfactorily operate as a battery.

Comparative Example 2

A coin battery was manufactured by the method as with Example 1 except that $LiCoO_2$ was used instead of the polyradical compound (a-1).

Thus-manufactured battery was subjected to charging and discharging as with Example 1. Then the discharged capacity per the electrode active material was calculated and it was 96 mAh/g. Charging and discharging were repeated 50 times in the range of 4.0 to 3.0 V. As a result, (discharged capacity at 50th time)/(discharged capacity at 1st time) was 95.1%. Further, (discharged capacity in discharging at 5.0 mA)/(discharged capacity in discharging at 0.1 mA) was 26.8%.

Comparative Example 3

A coin battery was manufactured by the method as with Example 1 except that 2,2,6,6-tetramethyl piperidinoxyl (TEMPO) was used instead of the polyradical compound (a-1).

The discharged capacity per the electrode active material was 35.2 mAh/g. As a result of repeating charging and discharging 12 times in the range of 4.0 to 3.0 V, it became impossible to conduct charging and discharging. Thus, the battery did not operate as a battery.

Comparative Example 4

An electrode was manufactured by the method as with Example 2 except that 1.0 g of poly(2,2,6,6-tetramethyl piperidinoxyl-4-yl methacrylate) (Mn: 127,000, Mw/Mn: 3.0) was used instead of the polyradical compound (a-1). Poly(2,2,6,6-tetramethyl piperidinoxyl-4-yl methacrylate) used here had a glass transition temperature of 153° C. The manufactured cathode layer had a thickness of 130 μm. Many coming offs and fine cracks were observed in the surface of the electrode.

Charging and discharging were conducted as with Example 2. Then the discharged capacity per the electrode active material was calculated and it was 56.9 mAh/g. Charging and discharging were repeated 50 times in the range of 4.0 to 3.0 V. As a result, (discharged capacity at 50th time)/(discharged capacity at 1st time) was 91.7%. Further, (discharged capacity in discharging at 5.0 mA)/(discharged capacity in discharging at 0.1 mA) was 48%.

The invention claimed is:

1. A method for manufacturing a polyradical compound, polymerizing at least a radical substituted vinyl ether compound represented by the following general formula (1) in the presence of a cationic polymerization catalyst to obtain a polyradical compound having a partial structure represented by the following general formula (2),

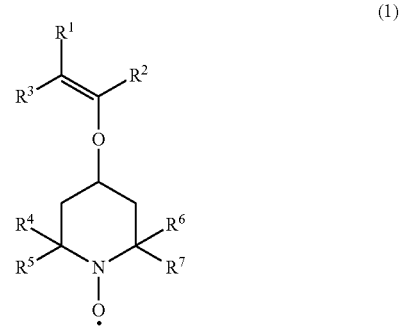

wherein, in the general formula (1), $R^1$ to $R^3$ independently represent a hydrogen atom or a methyl group; and $R^4$ to $R^7$ independently represent an alkyl group having 1 to 3 carbon atoms,

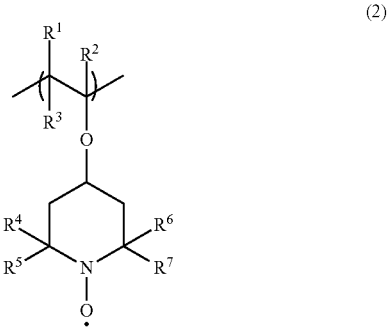

wherein, in the general formula (2), $R^1$ to $R^3$ independently represent a hydrogen atom or a methyl group; and $R^4$ to $R^7$ independently represent an alkyl group having 1 to 3 carbon atoms.

2. The method for manufacturing a polyradical compound according to claim 1, using a Lewis acid as the cationic polymerization catalyst.

3. The method for manufacturing a polyradical compound according to claim 1, conducting the polymerization in a halogenated organic solvent.

4. The method for manufacturing a polyradical compound according to claim 2, conducting the polymerization in a halogenated organic solvent.

* * * * *